(12) United States Patent
Kravets et al.

(10) Patent No.: US 10,303,914 B2
(45) Date of Patent: May 28, 2019

(54) FINGERPRINT SENSOR PATTERN

(71) Applicant: Cypress Semiconductor Corporation, San Jose, CA (US)

(72) Inventors: Igor Kravets, Lviv (UA); Oleksandr Hoshtanar, Lviv (UA); Igor Kolych, Lviv (UA); Oleksandr Karpin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/630,707

(22) Filed: Jun. 22, 2017

(65) Prior Publication Data

US 2018/0012055 A1 Jan. 11, 2018

Related U.S. Application Data

(63) Continuation of application No. 14/977,267, filed on Dec. 21, 2015, now Pat. No. 9,704,012.

(60) Provisional application No. 62/216,924, filed on Sep. 10, 2015.

(51) Int. Cl.
*G06K 9/00* (2006.01)
(52) U.S. Cl.
CPC ......... *G06K 9/0002* (2013.01); *G06K 9/0008* (2013.01)
(58) Field of Classification Search
None
See application file for complete search history.

(56) References Cited

U.S. PATENT DOCUMENTS

| 6,292,001 | B1 * | 9/2001 | Sasaki | G01B 7/003 |
| | | | | 324/661 |
| 6,556,935 | B2 | 4/2003 | Morimura et al. | |
| 6,759,264 | B2 | 7/2004 | Chou et al. | |
| 6,882,164 | B2 | 4/2005 | Yano et al. | |
| 8,970,796 | B2 | 3/2015 | Hoshtanar | |
| 9,007,333 | B1 * | 4/2015 | Wilson | G06F 3/044 |
| | | | | 178/18.06 |
| 2012/0050186 | A1 * | 3/2012 | Yi | G06F 3/044 |
| | | | | 345/173 |
| 2013/0194071 | A1 * | 8/2013 | Slogedal | G06K 9/0002 |
| | | | | 340/5.82 |
| 2013/0201153 | A1 * | 8/2013 | Schneider | G06F 3/044 |
| | | | | 345/174 |

(Continued)

FOREIGN PATENT DOCUMENTS

| CN | 103513848 A | 1/2014 |
| CN | 203930874 U | 11/2014 |

OTHER PUBLICATIONS

Camacho, Oscar, et al., "Designing Touch Sensing Electrodes," dated Jul. 2011; 28 pages.

(Continued)

*Primary Examiner* — Delomia L Gilliard

(57) ABSTRACT

An example system drives one or more transmit signals on first electrodes disposed in a first layer and propagating electrodes disposed in a second layer. The system measures a capacitance of sensors through a of second electrodes. Each second electrode crosses each first electrode to provide a plurality of discrete sensor areas, each discrete sensor area associated with a difference crossing and including a portion of at least one propagating electrode. Each second electrode is galvanically isolated from the first electrodes and the propagating electrodes.

20 Claims, 12 Drawing Sheets

(56) References Cited

U.S. PATENT DOCUMENTS

| | | | |
|---|---|---|---|
| 2013/0314105 A1 | 11/2013 | Setlak et al. | |
| 2013/0341651 A1* | 12/2013 | Kim | H01L 31/0232 257/84 |
| 2014/0168149 A1* | 6/2014 | Han | G06F 3/0412 345/174 |
| 2014/0241595 A1* | 8/2014 | Bernstein | G06K 9/0002 382/124 |
| 2014/0333328 A1 | 11/2014 | Nelson et al. | |
| 2016/0042217 A1* | 2/2016 | Kim | G06F 3/041 382/124 |
| 2017/0076130 A1 | 3/2017 | Kravets et al. | |

OTHER PUBLICATIONS

International Search Report for International Application No. PCT/US16/50226 dated Sep. 27, 2016; 4 pages.

Silicon Laboratories, Inc., "How to Minimize Touchscreen Electromagnetic Interference," 7 pages.

USPTO Final Rejection for U.S. Appl. No. 14/977,267 dated Jul. 28, 2016; 12 pages.

USPTO Non-Final Rejection for U.S. Appl. No. 14/977,267 dated Oct. 31, 2016; 12 pages.

USPTO Non-Final Rejection for U.S. Appl. No. 14/977,267 dated Mar. 25, 2016; 11 pages.

USPTO Notice of Allowance for U.S. Appl. No. 14/977,267 dated Mar. 2, 2017; 7 pages.

Written Opinion of the International Searching Authority for International Application No. PCT/US16/50226 dated Sep. 27, 2016; 7 pages.

SIPO Office Action for Application No. 201680052333.6 dated Jul. 31, 2018 6 pages.

SIPO Office Action for Application No. 201680052333.6 dated Jan. 20, 2019; 3 pages.

\* cited by examiner

| RECTANGULAR PROPAGATING ELECTRODE | PROPAGATING ELECTRODE EFFECT ON SENSOR SIGNAL RESPONSE TO FINGERPRINT RIDGE | | | | | | | |
|---|---|---|---|---|---|---|---|---|
| | 25um ISOLATER THICKNESS | | | | 40um ISOLATER THICKNESS | | | |
| | RIDGES PARALLEL TO RX ELECTRODES | | RIDGES PARALLEL TO TX ELECTRODES | | RIDGES PARALLEL TO RX ELECTRODES | | RIDGES PARALEL TO TX ELECTRODES | |
| | fF | % INCREASE | fF | % INCREASE | fF | % INCREASE | fF | % INCREASE |
| NONE | 0.116 | 0 | 0.104 | 0 | 0.085 | 0 | 0.072 | 0 |
| 30um x 60um | 0.15 | 30 | 0.119 | 14 | 0.109 | 28 | 0.08 | 10 |
| 15um x 50um | 0.139 | 20 | NO DATA | NO DATA | 0.102 | 19 | 0.08 | 11 |
| 30um x 15um | 0.13 | 12 | 0.12 | 15 | 0.094 | 11 | 0.082 | 13 |

*FIG. 7*

FINGERPRINT SENSOR PATTERN

RELATED APPLICATIONS

This application is Continuation Application of U.S. Non provisional application Ser. No. 14/977,267, filed Dec. 21, 2015, which claims the priority benefit of U.S. Provisional Application No. 62/216,924, filed Sep. 10, 2015, all of which are incorporated herein by reference in their entirety.

TECHNICAL FIELD

The subject matter relates to the field of biometric sensors. More specifically, but not by way of limitation, the subject matter discloses arrangements of fingerprint sensor patterns.

BACKGROUND

Capacitance sensing systems function by sensing electrical signals generated on electrodes that represent changes in capacitance. Such changes in capacitance can indicate the presence of ridges and valleys of a fingerprint. Fingerprint sensing may be used for security and validation applications for a variety of user interface devices, such as mobile handsets, personal computers, and tablets. The use of capacitance sensing for fingerprint detection may allow for a sensor to be placed in the surface of a user interface device with a great degree of configurability. That is, a sensor is not constrained to a single location for all devices. Rather, a fingerprint sensor may be disposed in a location on the device that is convenient for a particular industrial design, or to optimize a user's experience.

Capacitance-based fingerprint sensors function by measuring the capacitance of a capacitive sense element, such as a sensor electrode, and detecting a change in capacitance indicating a presence or absence of a fingerprint ridge (or valley). Ridges and valleys at identifiable locations on an array of sense elements may be used to reconstruct the image of the fingerprint for use in enrollment, validation, and security applications. When a fingerprint ridge comes into contact with or is in close proximity to a sense element, the capacitance change caused by the fingerprint ridge is detected. The capacitance change of the sense elements can be measured by an electrical circuit that converts the capacitances measured from the capacitive sense elements into digital values.

BRIEF DESCRIPTION OF THE DRAWINGS

Some embodiments are illustrated by way of example and not limitation in the figures of the accompanying drawings in which:

FIG. 7 is a chart diagram including sensor signal results with and without the use of rectangular propagating electrodes, in accordance with embodiments;

DETAILED DESCRIPTION

Fingerprint sensor patterns are described. In the following description, for purposes of explanation, numerous examples are set forth in order to provide a thorough understanding of the embodiments. It will be evident to one skilled in the art that the claimed subject matter may be practiced in other embodiments. The detailed description discloses examples of fingerprint sensor patterns including electrodes arranged in various patterns and layers, which when energized, provide an enhanced response to fingerprint features proximate to the electrodes compared to existing arrangements.

Figure 1:
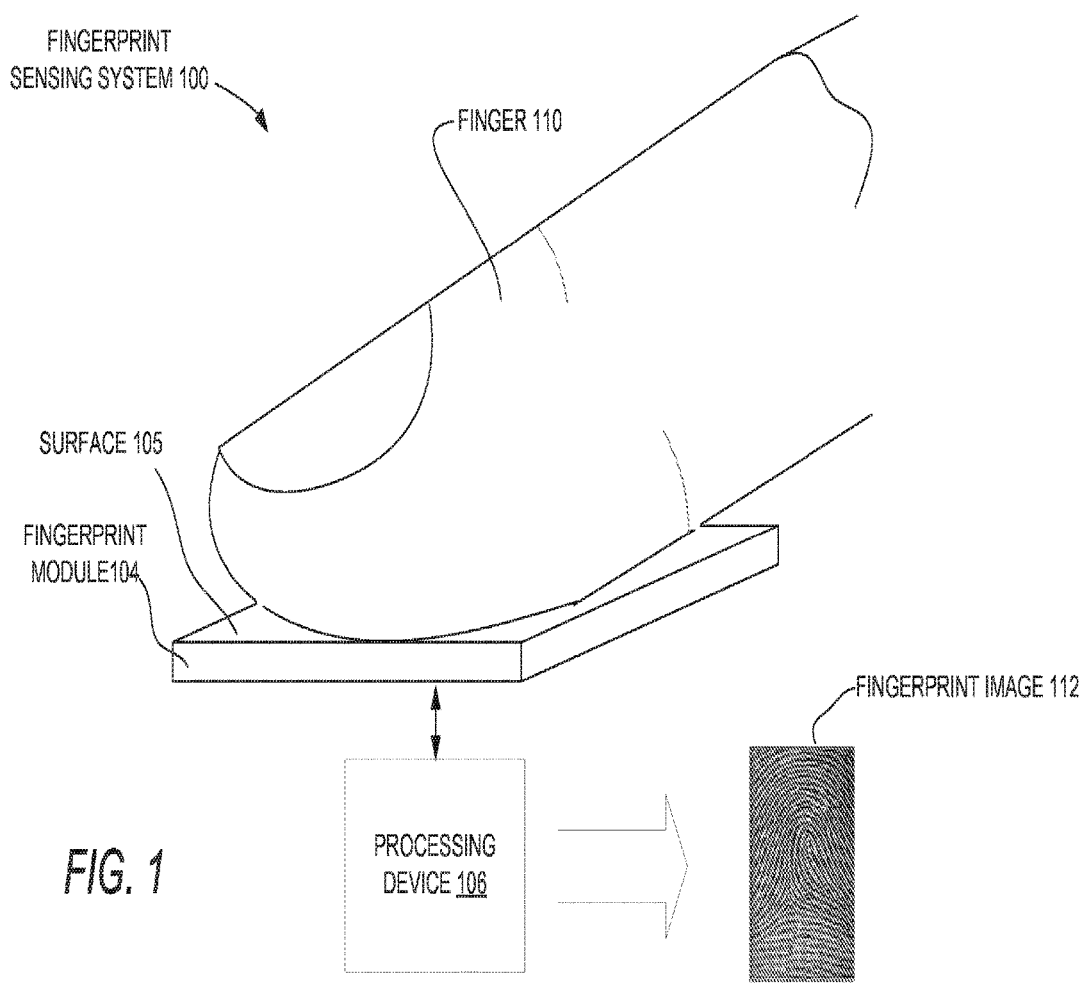
FIG. 1 is a block diagram illustrating a fingerprint sensing system, in accordance with various embodiments.

Some embodiments are now briefly introduced and then discussed in more detail along with other embodiments beginning with FIG. 1. In an embodiment, a fingerprint module provides multiple capacitive sensors used by a processing device to detect fingerprint features. The capacitive sensors can be constructed on a substrate from multiple layers, including but not limited to, a layer including transmit (TX) electrodes, a layer including receive (RX) electrodes and propagating electrodes, and a layer including insulating material to galvanically isolate the TX electrodes from the RX electrodes. An overlay material to cover and/or protect the capacitive sensors may be placed above the RX electrodes.

In an embodiment, the TX electrodes (e.g., rows of TX electrodes), the RX electrodes (e.g., columns of RX electrodes), and propagating electrodes are arranged in a pattern in which each TX electrode intersects (e.g. crosses) each RX electrode. The intersections form a repeating unit (e.g., a unit cell) of the pattern that can define the resolution of the fingerprint module. The unit cells correspond to discrete locations where a processing device can resolve a fingerprint feature. Each capacitive sensor corresponds to a unit cell, and includes an intersection between a TX electrode and an RX electrode, and at least a portion of a propagating electrode. The processing device can measure each capacitive sensor to detect a fingerprint feature proximate to the capacitive sensor. To measure a capacitive sensor, the electric potential of the TX electrode is coupled to the propagating electrode and the RX electrode and the processing device receives a resulting sensor signal from the RX electrode. When a fingerprint feature is proximate to a capacitive sensor, the sensor signal includes a signal component that indicates a change in capacitance of the RX electrode caused by the proximity of the fingerprint feature. The sensor signal may also include noise components and other components that are not useful for fingerprint feature detection. The processing device can then generate an image of a fingerprint based on the fingerprint features detected at the multiple capacitive sensors.

The physical and electrical relationships between TX electrodes, RX electrodes, propagating electrodes, insulating material, overlay material and other components, as well as their individual attributes, determine the capacitance change of a capacitive sensor indicated on the RX electrode in response to a proximate fingerprint feature. These relationships and attributes also determine the level of uniformity in signal response (e.g., the level of anisotropy) to fingerprint features presented at different angles relative to the RX electrode, for example, of the capacitive sensor. The TX potential will affect the change in capacitance of the capacitive sensor caused by the fingerprint feature and injected noise will affect the signal-to-noise ratio (SNR) of the sensor signal. Increasing coverage of the substrate by TX electrodes (e.g., minimizing deletions between TX electrodes) may increasingly shield noise from being injected into the sensor signal (e.g., by system elements opposite the TX electrodes from the RX electrodes). Thus, different attributes of the TX electrodes, insulating material, propagating electrodes, RX electrodes and/or overlay material and relationships (e.g., physical and electrical) between these components may be applied in various combinations, per capacitive sensor, and adjusted to design capacitive sensors that meet targeted sensor signal levels at acceptable SNR and anisotropy.

In configurations without the propagating electrodes, the insulating material and the overlay, depending on their thicknesses and material properties, can reduce the sensitivity of the capacitive sensors such that their sensor signals do not allow accurate fingerprint feature detection. The fingerprint sensor patterns and arrangements described herein use propagating electrodes to increase the change in capacitance of capacitive sensors caused by the proximity of a fingerprint feature (oriented in any direction) to the capacitive sensors. This increases a useful component of the sensor signal, the SNR of the sensor signal, and the anisotropy of the sensor signal, which result in more accurate fingerprint feature detection, fingerprint image generation, and fingerprint authentication.

In an example embodiment of a fingerprint sensor pattern multiple TX electrodes disposed in a first layer cross with multiple RX electrodes disposed in a second layer. In this embodiment, the second layer is closer to the fingerprint input surface than the first layer. Multiple propagating electrodes are disposed in the second layer along with the multiple RX electrodes. In a plan view of the fingerprint sensor pattern, an area of each propagating electrode is located within an area of each TX electrode. In the second layer, each RX electrode is disposed between two or more of the multiple propagating electrodes. Each RX electrode is also galvanically isolated from each propagating electrode and each TX electrode. Each RX electrode and propagating electrode couples with the TX signal. The propagating electrodes may be capacitively or conductively coupled with the TX signal. When coupled with the TX signal, the propagating electrodes hold electric potential of the TX electrodes in the second layer and capacitively couple with the RX electrodes. Each capacitive sensor of the fingerprint sensor pattern comprises an intersection between a TX electrode and an RX electrode and comprises at least a portion of a propagating electrode.

When a fingerprint feature capacitively couples with a propagating electrode, it shunts charge from an RX electrode, resulting in an increased change in capacitance of the capacitive sensor compared to embodiments without propagating electrodes. This increases the useful component of the sensor signal, the SNR of the sensor signal, and the anisotropy of the sensor signal, which can result in the more accurate fingerprint feature detection, fingerprint image generation, and fingerprint authentication. Further embodiments are described herein.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating a fingerprint sensing system 100 in accordance with various embodiments. The fingerprint sensing system 100 includes fingerprint module 104 and a processing device 106. The fingerprint module 104 includes a surface 105 (e.g., and overlay) to receive a fingerprint from a finger 110 which may coincide with an active area under which capacitive sensors may experience changes capacitances in response to the proximity of fingerprint features of the finger 110. The fingerprint module 104 and/or its active area may be in the shape of a square, rectangle, circle, or any other shape, without departing from the claimed subject matter. In an embodiment, fingerprint features may include, but not be limited to, valleys and ridges forming arches, loops, and whorls.

The processing device 106 is to scan the capacitive sensors for sensor signals representing the changes in a capacitance and then use those signals to generate a fingerprint image 112. As used herein, "fingerprint image" refers to a set of data values (e.g., fingerprint data) that represents a fingerprint in digital format. In some embodiments, a fingerprint image may be a dataset that visually represents the valleys and ridges of a fingerprint with their arches, loops, and whorls. In other embodiments, a fingerprint image may be a dataset that digitally represents a fingerprint in a non-visual form. For example, a data structure with data values from which a visual representation of the fingerprint may be obtained after further processing or which may be used by various fingerprint processing operations.

The fingerprint sensor system's 100 ability to acquire and process fingerprint image data overcomes unique challenges that are not necessarily (if at all) addressed by techniques developed for typical touch sensing. The structure and operation of the fingerprint sensing system 100 differs from other, common sensor modules (e.g., such as touch-screen sensor modules) in at least several aspects. For example, the active area of the fingerprint module 104 may be one to two orders of magnitude (e.g., about 100 times) smaller than the active area of a typical touch-screen sensor module. In an embodiment, the fingerprint module 104 is designed such that the finger 110 covers the majority (e.g., more than 75%) of its active area. In various embodiments, the active area of the fingerprint module 104 is in the range from 4×4 mm to 12×12 mm. For a typical capacitive touch (e.g., touch-screen) sensor module (e.g., on a smartphone), a contact from a single conductive object (e.g., user's finger or a stylus) typically covers only a small fraction of the touchscreen active area and the active area may be around 50×100 mm (and even larger active areas for tablets and laptop/notebook computers).

The number of capacitive fingerprint sensors (e.g., 14,000) that may be used in the fingerprint module 104 is significantly larger than the number of capacitive touch sensors (e.g., 200) that may be used in a touch-screen sensor module. Further, the change in capacitance (e.g., 0.05 fF) that may be measured in a fingerprint sensing system 100 to detect a fingerprint feature is significantly smaller than the change in capacitance (e.g., 300 fF) that may be used by typical touch-screen systems to detect a touch. Thus, fingerprint sensing system 100 must be sensitive and manage or avoid noise signals in order to capture a usable fingerprint image.

Figure 2:
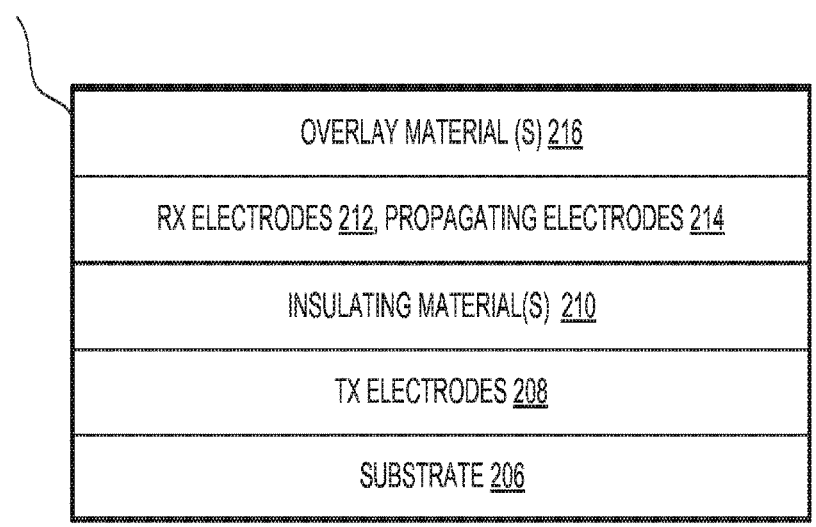
FIG. 2 is a block diagram illustrating layers of a fingerprint module, in accordance with various embodiments.

The fingerprint module 104, including its surface 105 and capacitive sensors, may be constructed from multiple layers of material. Example layers associated with the fingerprint module 104 are discussed with respect to FIG. 2. FIG. 2 is a block diagram illustrating layers of a fingerprint module 204, in accordance with various embodiments. The substrate 206 may serve as a foundation and electrical insulator for layers and/or components coupled directly or indirectly to its surface. In embodiments, the substrate 206 may include a ball grid array substrate, a flexible or rigid printed board or any material or combination of materials suitable for providing sufficient foundation and electrical insulation. In an embodiment, the processing device 104 of the fingerprint sensing system 100 is coupled to the substrate (e.g., on a same side or a different side than other components) and may be a source of noise that affects the SNR of sensor signals.

On top of the substrate 206 is shown a layer including TX electrodes 208, a layer including an insulating material 210, a layer including RX electrodes and propagating electrodes 214, and a layer including an overlay material 216. Other embodiments of the fingerprint module 204 may include a greater or fewer number of layers to provide the components of the layers (e.g., the TX electrodes 208, the insulating material 210, the RX electrodes 212, the propagating electrodes 214, and the overlay material 216) and/or additional components (not shown). Other embodiments may also provide the components using a different order of layers or by combining one or more of the components in common layers. Alternatively or additionally, some components may be provided in more than one layer.

The TX electrodes 208 capacitively couple with the RX electrodes 212 to form the capacitive sensors. The insulating material 210 serves to isolate the TX electrodes 208 from the RX electrodes 212, and the propagating electrodes 214. The isolation of the TX electrodes 208 from the RX electrodes 212 is galvanic. In some embodiments, the isolation of the TX electrodes 208 from the RX electrodes 212 is galvanic. The insulating material 210 may include any dielectric material suitable for target capacitance ranges of a particular fingerprint sensing application. The insulating material 210 may include a layer of adhesive, epoxy or be provided by the resin in a layer of a PCB. In an embodiment, the more electrically insulative the insulating material 210, the less electromagnetic fields from the TX electrodes are able to carry the TX potential to the layer including the RX electrodes 212 and the propagating electrodes 214. In an embodiment, propagating electrodes 214 electrically couple with the TX electrodes to carry the TX electric potential to the layer including the RX electrodes 212. As further discussed below, this increases the effect of a proximate fingerprint feature on the capacitance of a capacitive sensor.

The TX electrodes 208, RX electrodes 212, and propagating electrodes 214 are formed from conductive material and may be disposed in their respective layers, like the insulating material 210 and overlay 216, through deposition, coating, material removal, patterning, and/or other electronic device fabrication techniques. The transparency or visibility of the selected conductive material may vary in different embodiments, without departing from the claimed subject matter. In various embodiments, one or more of the TX electrodes 208, RX electrodes 212, and the propagating electrodes 214 may be formed from metal (e.g., copper traces), indium tin oxide, or other conductive material on or within one or more layers of a thin film, PCB, glass, or other material. The TX electrodes 208, RX electrodes 212, and the propagating electrodes 214 may be also be implemented as chip on glass. Example sensor arrays based on TX electrodes, RX electrodes, and propagating electrodes are further discussed below beginning with the discussion of FIG. 3.

The overlay material 216 is to cover and/or protect the underlying components from direct physical contact by a finger or other objects. The thickness and durability of the overlay material 216 may be selected for different applications and/or to withstand contact by fingers and other objects for a service life. In some embodiments, the thicker the overlay material 216 covering the capacitive sensors, the less sensitive the capacitive sensors become (e.g., the less a proximate fingerprint feature can change the capacitance of a capacitive sensor). In some embodiments, the thickness of the overlay material 216 is thicker than a pitch of the TX electrodes and/or the RX electrodes. In an embodiment, the increased sensor sensitivity and reduced anisotropy provided by the propagating electrodes 214 can offset the negative effect of the overlay material 216. In various embodiments, the overlay material 216 may be glass, ceramic, crystal sapphire, kapton tape, or other materials suitable to the system design parameters. The level of conductivity of the overlay material, for a given thickness, can also affect sensor sensitivity (e.g., negatively or positively). In some embodiments, the overlay material 216 is between 100 um and 250 um thick. The overlay material 216 may be thinner than 100 um or thicker than 250 um in other embodiments.

Through the embodiments described herein, the physical arrangement of the TX electrodes, RX electrode, and propagating electrodes may be optimized to achieve target sensor performance including sensitivity to fingerprint features, SNR, anisotropic response level (e.g., the degree of uniformity of signal response to fingerprint features varying in angle relative to the RX electrodes and/or TX electrodes). Example arrangements of these fingerprint sensor component s are described with respect to FIGS. 3-11.

Figure 3:
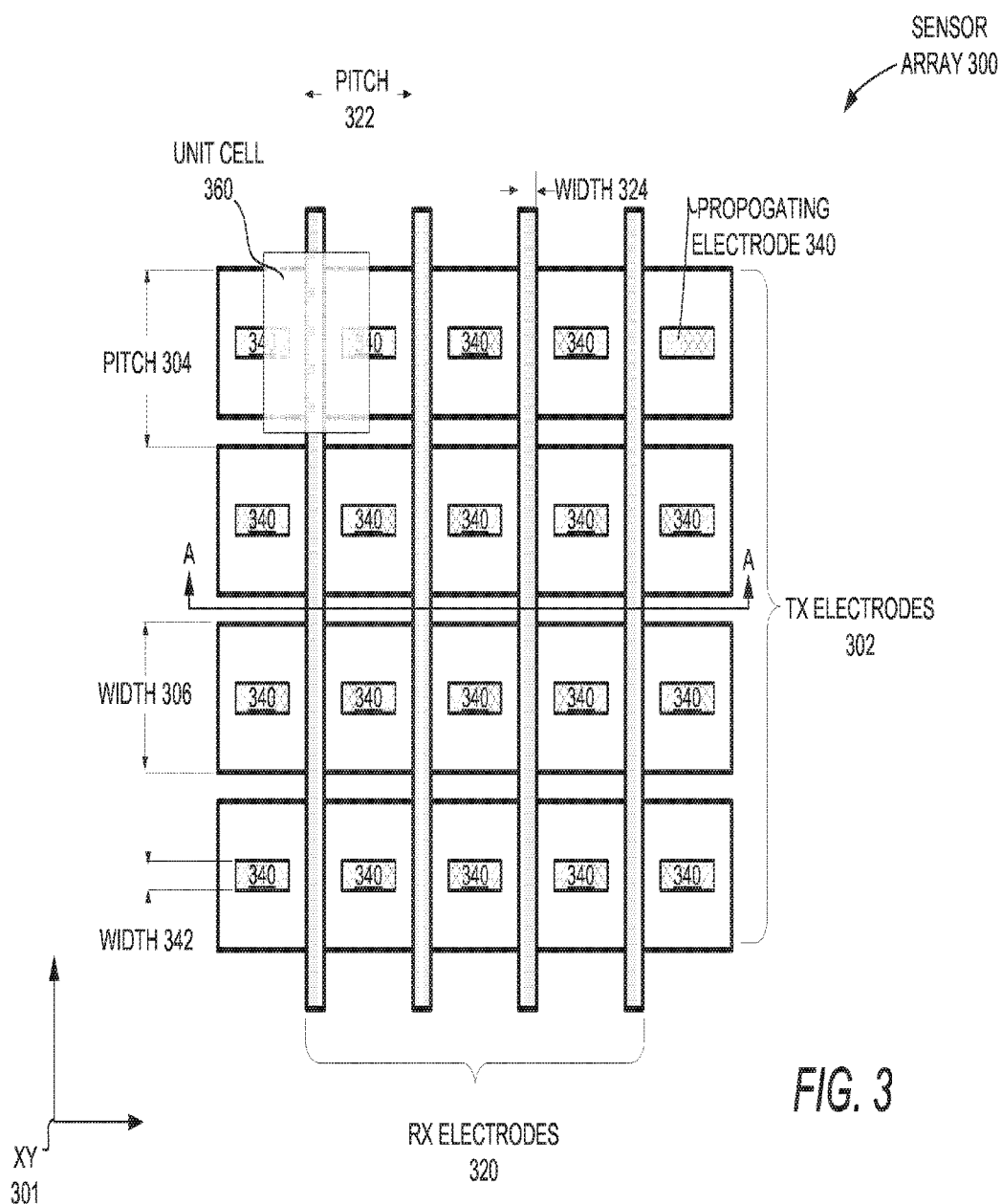
FIG. 3 is a block diagram illustrating a plan view of a sensor array, in accordance with embodiments.

FIG. 3 is a block diagram illustrating a plan view of a sensor array 300 (e.g., a capacitive fingerprint sensor array), in accordance with embodiments. The sensor array 300 includes TX electrodes 302 crossing (e.g., intersecting) with RX electrodes 320. Each unit cell (e.g., the unit cell 360) at (e.g., centered on) each intersection between a TX electrode 302 and an RX electrode 320 corresponds to a fingerprint capacitive sensor.

In the embodiments described herein, a capacitive sensor may correspond to a unit cell. The unit cell 360 includes an area where a TX electrode 302 and a propagating electrode 340 capacitively couple to an RX electrode 320 and where the capacitance can be measured through the RX electrode 320. The unit cell 360 is shown to be square in shape but the unit cell 360 (e.g., and corresponding capacitive sensor) may be shaped differently without departing from the claimed subject matter. For ease of illustration, sensor array 300 shows only a portion of the total number of TX electrodes 302 and RX electrodes 320 that may be used in the fingerprint module 104 of FIG. 1. In some embodiments, the number of RX electrodes 320 and TX electrodes 302 may range from 100 to 150 each, resulting in 10,000 or more measurable capacitive sensors. A pitch of the capacitive sensors may be less than 100 um (e.g., 70 um) and in some embodiments, the pitch is selected such that each fingerprint feature placed on the fingerprint sensor can be detected by at least three capacitive sensors.

In the plan view of the sensor array 300, the area of each propagating electrode 340 is positioned above an area of a TX electrode 302, and an area of each TX electrode 302 is positioned below an area of a propagating electrode 340. The partial or total area consumed by each propagating electrode 340, as shown in the plan view, may be located within the area of a corresponding TX electrodes 302 and between adjacent RX electrodes 320. The area of each unit cell 360 and/or the corresponding capacitive sensor may overlap with the area of a propagating electrode 340. In some embodiments, a total area of a propagating electrode 340 may overlap with the area of a unit cell 360 (e.g., see FIG. 11) and/or the corresponding capacitive sensor.

The propagating electrodes 340 are shown to be spaced apart from one another along a TX electrode 302, with an RX electrode 302 disposed between and adjacent to two propagating electrodes 340, the pattern alternating between propagating electrodes 340 and RX electrodes. In other embodiments, RX electrodes 320 may be disposed between more than two propagating electrodes 320 or more than one RX electrode 320 may be disposed between propagating electrodes 340. The propagating electrodes 340 over each TX electrode 302 are shown to be aligned along an axis (not shown) of that TX electrode 302. In an embodiment, this axis intersects only the corresponding TX electrode 302 (e.g., at the midpoint of its width 324) and is parallel to the X-axis of the XY axes 301 (e.g., a horizontal axis). Propagating electrodes 340 over different TX electrodes 302 are shown to be aligned along an axis (not shown) that intersects multiple different TX electrodes 302. In an embodiment, this axis is parallel to the Y-axis of the X-Y axis 301 (e.g., a vertical axis). As will be described in further detail below, various shapes, sizes, locations, and other attributes of propagating electrodes 340 may be employed in a sensor array, without departing from the claimed subject matter.

The TX electrodes 302, having the width 306, are shown to be spaced apart according to pitch 304. The amount of space between each TX electrode 302 (e.g., a deletion) is defined by the pitch 304 minus the width 306. The RX electrodes 320, having the width 324, are shown to be spaced apart according to the pitch 322. The propagating electrodes 340, having the width 342, are shown to be equally spaced apart but their spacing, TX electrode pitch, and RX electrode pitch may not be constant across a sensor array in various embodiments.

In an embodiment, the width 306 of one or more of the TX electrodes 302 is greater than half the pitch 304 and the width 324 of one or more of the RX electrodes 320 is less than half of the pitch 322. In some embodiments, the thickness of the overlay material is greater than a pitch of the TX electrodes 302 and/or the RX electrodes 320. The width of the unit cell 360 may be equal to the pitch 304 and/or the pitch 322. The width 342 of each propagating electrode 342 may be substantially the same (e.g., subject to selected manufacturing tolerances) as the width 324 of the RX electrodes 320. In embodiments, the greater the ratio between the pitch 304 and the width 306 of the TX electrodes 302, the more the TX electrodes 302 can shield the capacitive sensors from noise injected by noise sources (e.g., a processing device) located nearby (e.g., coupled to the substrate below the TX electrodes 302). Wider TX electrodes 302 may also strengthen capacitive coupling to the RX electrodes 320 and the propagating electrodes 340. Such noise shielding and strengthened capacitive coupling may result in a higher overall signal response (e.g., useful component of sensor signal) and SNR. In some embodiments, the width 306 of the TX electrodes 302 is between 20 um and 65 um and the width 324 of each RX electrode 320 and propagating electrode 340 is between 5 um and 15 um. The TX electrodes 302 and the RX electrodes 320 may be made of non-transparent metal material and have the same pitch in the range of 40 um to 80 um.

Figure 4:
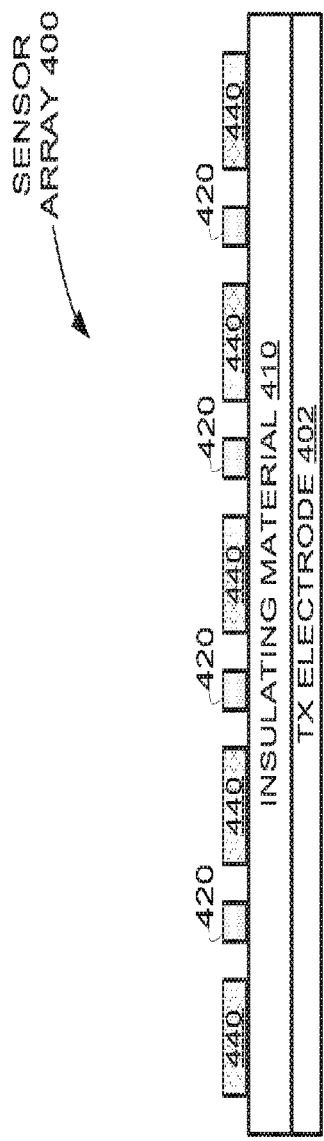
FIG. 4 is a block diagram illustrating a cross-sectional view of a sensor array, in accordance with an embodiment.
Figure 5:
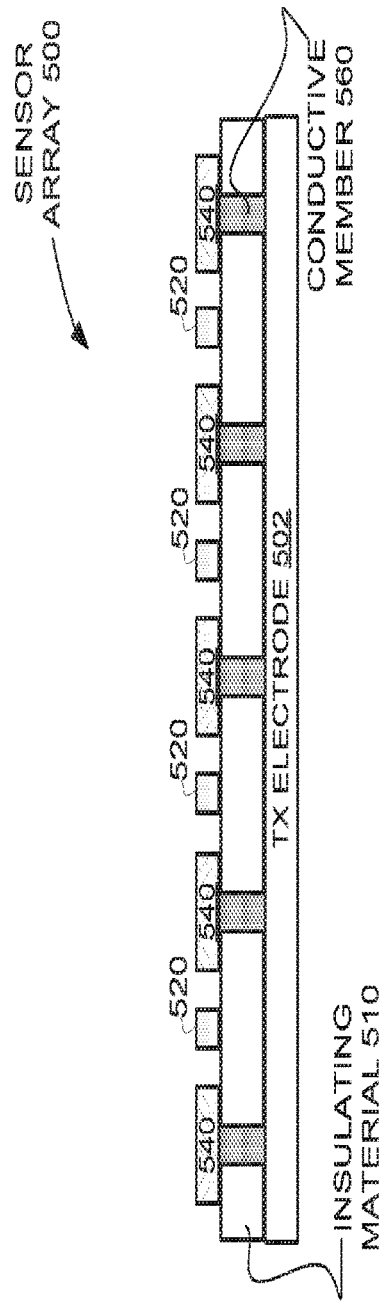
FIG. 5 is a block diagram illustrating a cross sectional view of a sensor array, in accordance with an embodiment.

As introduced above, to increase the effect of a proximate fingerprint feature on the capacitance of a capacitive sensor (e.g., corresponding to a unit cell), the propagating electrodes 340 electrically couple with the TX electrodes 302 to carry the electric potential of the TX electrodes to the layer including the RX electrodes 320. FIGS. 4 and 5 illustrate embodiments for electrically coupling the propagating electrodes 340 to the TX electrodes 302.

FIGS. 4 and 5 are block diagrams illustrating a cross-sectional view (along the section A-A) of different embodiments of the sensor array 300 of FIG. 3. FIG. 4 shows a cross-sectional view of a sensor array 400 including insulating material 410 disposed between a TX electrode 402 on the bottom and propagating electrodes 440 and RX electrodes 420 on the top. In this embodiment, the insulating material 410 galvanically isolates the TX electrodes 402 from the propagating electrodes 440. The TX electrodes 402 may then capacitively couple with the propagating electrodes 440 to carry electrical potential of the TX electrodes 402 up to the same layer as the RX electrodes 420.

Similarly, FIG. 5 shows a cross-sectional view of a sensor array 500 including an insulating material 510 disposed between TX electrode 502 on the bottom and propagating electrodes 540 and RX electrodes 520 on the top. In this embodiment, conductive members 560 (e.g., metal traces) conductively couple the TX electrodes 402 to the propagating electrodes 440 to provide the electrical potential to the same layer as the RX electrodes 520. The conductive members 560 may be provided in via holes through the insulating material 510, or by any other common routing techniques to transferring the electrical potential of the TX electrodes (e.g., the TX potential) closer to the surface 105 of the fingerprint module 104 of FIG. 1. Providing this electric potential where the fingerprint features of the finger 110 are closest, increases the effect of a proximate fingerprint feature on the change of capacitance of the capacitive sensors, resulting in increased SNR.

Figure 6:
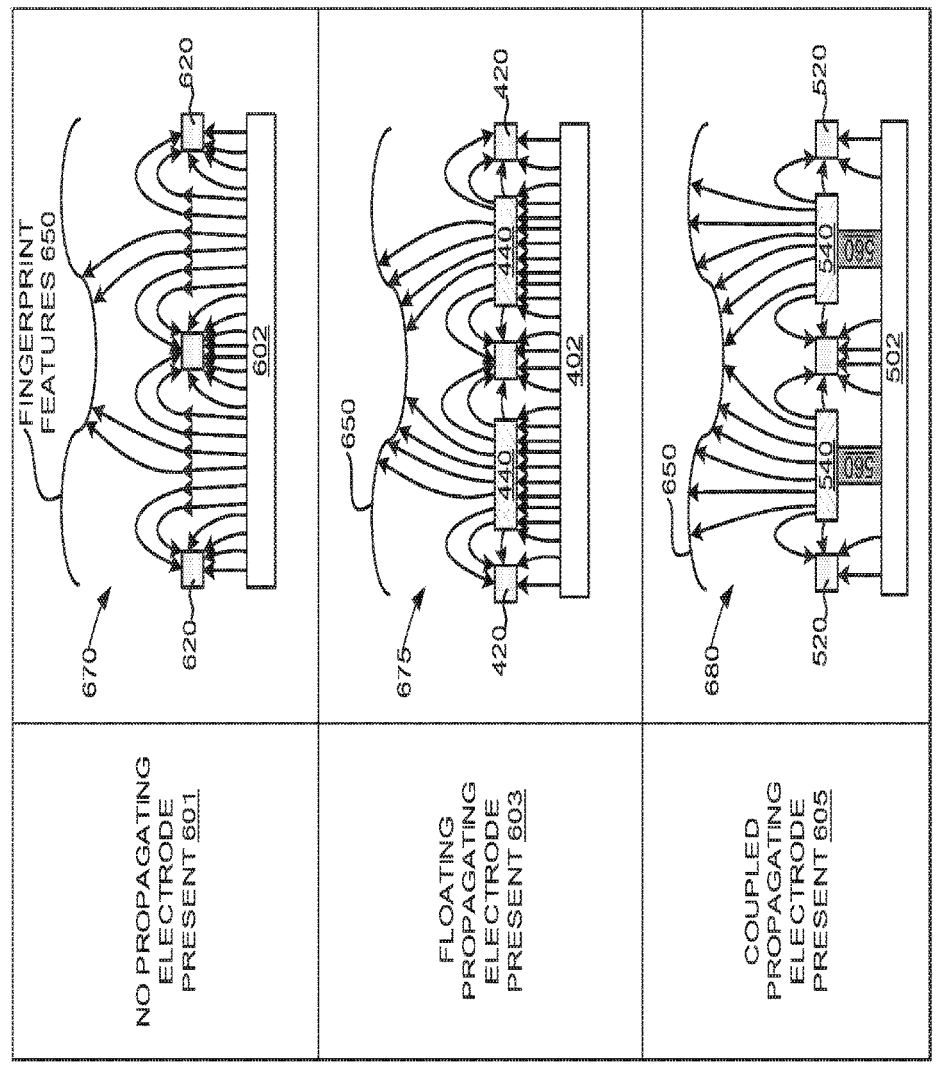
FIG. 6 is a chart diagram illustrating a propagating electrode's effect on capacitance in response to a fingerprint feature, in accordance with embodiments.

FIG. 6 is a chart diagram illustrating propagating electrode effect on capacitance in response to a fingerprint feature, in accordance with embodiments. FIG. 6 shows the cases where no propagating electrode is present 601 in a capacitive sensor, a floating propagating electrode is present 603 in a capacitive sensor, and coupled propagating electrode is present 605 in a fingerprint capacitive sensor. For ease of explanation, the measurement of capacitive sensor of each case (601, 603, and 605) is discussed with respect to the middle RX electrode of the three RX electrodes. The number of field lines pointing to the fingerprint features 650 is proportional to the amount of electric potential available on the propagating electrodes in the same layer as the RX electrodes. The greater the electric potential in the same layer as the RX electrodes, the greater the capacitance between fingerprint features and the propagating electrodes of the capacitive sensor. Thus, the more field lines pointing to the fingerprint features 650, the greater the change in capacitance of the capacitive sensor caused by the fingerprint features 650.

The case of no propagating electrode present 601 generates the fewest number of field lines between the capacitive sensor 670 (e.g., including the TX electrode 602, and the middle RX electrode 620) and the fingerprint features 650 because the potential difference between the two is the lowest of the three cases.

In the case where the floating propagating electrodes are present 603, the potential difference between capacitive sensor 675 and the fingerprint features 650 increases with the propagating electrodes 440 capacitively coupled with the TX electrode 402. In this embodiment, the capacitance between the TX electrode 402 and the propagating electrodes 440 is greater than the capacitance between the TX electrode 402 and the middle RX electrode 420. The case where the floating propagating electrodes are present 603 generates a greater number of field lines between the capacitive sensor 675 and the fingerprint features 650 than the case where no propagating electrodes are present 601. Thus, the capacitance between fingerprint features 650 and the propagating electrodes 440 of the capacitive sensor 675 is greater than the capacitance between the fingerprint feature 650 and the capacitive sensor 670.

In the case where the coupled propagating electrodes are present 605, the potential difference between the capacitive sensor 680 and the fingerprint features 650 further increases with the direct conductive path between the propagating electrodes 540 and the TX electrode 502 provided by the conductive members 560. As a result, the case in which the coupled propagating electrodes are present 605 yields the greatest sensor sensitivity because this case generates the greatest number of field lines between the capacitive sensor and the fingerprint features 650 out of all three cases. The capacitance between fingerprint features 650 and the propagating electrodes 540 of the capacitive sensor 680 is greater than the capacitance between the fingerprint features and the capacitive sensors in the cases 601 and 603, discussed above. Thus the change of capacitance of the capacitive sensor 680 of case 605, as measured on the middle RX electrode 520 is greater than the change in capacitance of the capacitive sensors 670 and 675 of case 601 and case 603, respectively.

FIG. 7 is a chart diagram including sensor signal results with and without the use of rectangular propagating electrodes, in accordance with embodiments. Sensors arrays with a 25 um thick insulating layer and a 40 um thick insulating layer were tested. Sensor arrays with each of these insulating layer thicknesses were separately tested with no propagating electrode and rectangular propagating electrodes sized at 30 um×60 um, 15 um×50 um, and 30 um×15 um, respectively. For each test, the sensor signals in response to ridges parallel to RX electrodes and ridges parallel to TX electrodes were measured and are shown in FIG. 7 in units of femtofarads. The results illustrate the increased sensor signal values that result from the use of propagating electrodes as well as the effect that shape, size, and position of propagating electrodes may have on the level of isotropic signal response.

As illustrated in the embodiments, the attributes of size, shape, arrangement, number, and/or material composition of TX electrodes, insulating material layer, propagating electrodes, RX electrodes and/or overlay material, per capacitive sensor, can affect the capacitance between TX electrodes and the propagating electrodes, the direction of electric field lines to the propagating electrodes, and/or the overall amount of TX potential transferred to the propagating electrodes. Furthermore, the attributes of the TX electrodes, insulating layer, propagating electrodes, RX electrodes and/or overlay material, per capacitive sensor, can affect the capacitances between the TX electrodes and RX electrodes as well as the capacitances between RX electrodes and propagating electrodes.

The physical and electrical relationships between these components per capacitive sensor determine the capacitance change of the RX electrode in response to a proximate fingerprint feature. The relationships also determine the level of uniformity in sensor signals to fingerprint features presented at different angles relative to the RX electrode of the capacitive sensor (e.g., the level of anisotropy). In all cases, the TX potential will affect the change in capacitance of the capacitive sensor caused by the fingerprint feature and injected noise will affect the SNR ratio of the sensor signal. Increasing coverage of the substrate by TX electrodes (e.g., minimizing deletions between TX electrodes) may increasingly shield noise from being injected into the sensor signal by circuit elements opposite the TX electrodes from the RX electrodes.

Figure 8:
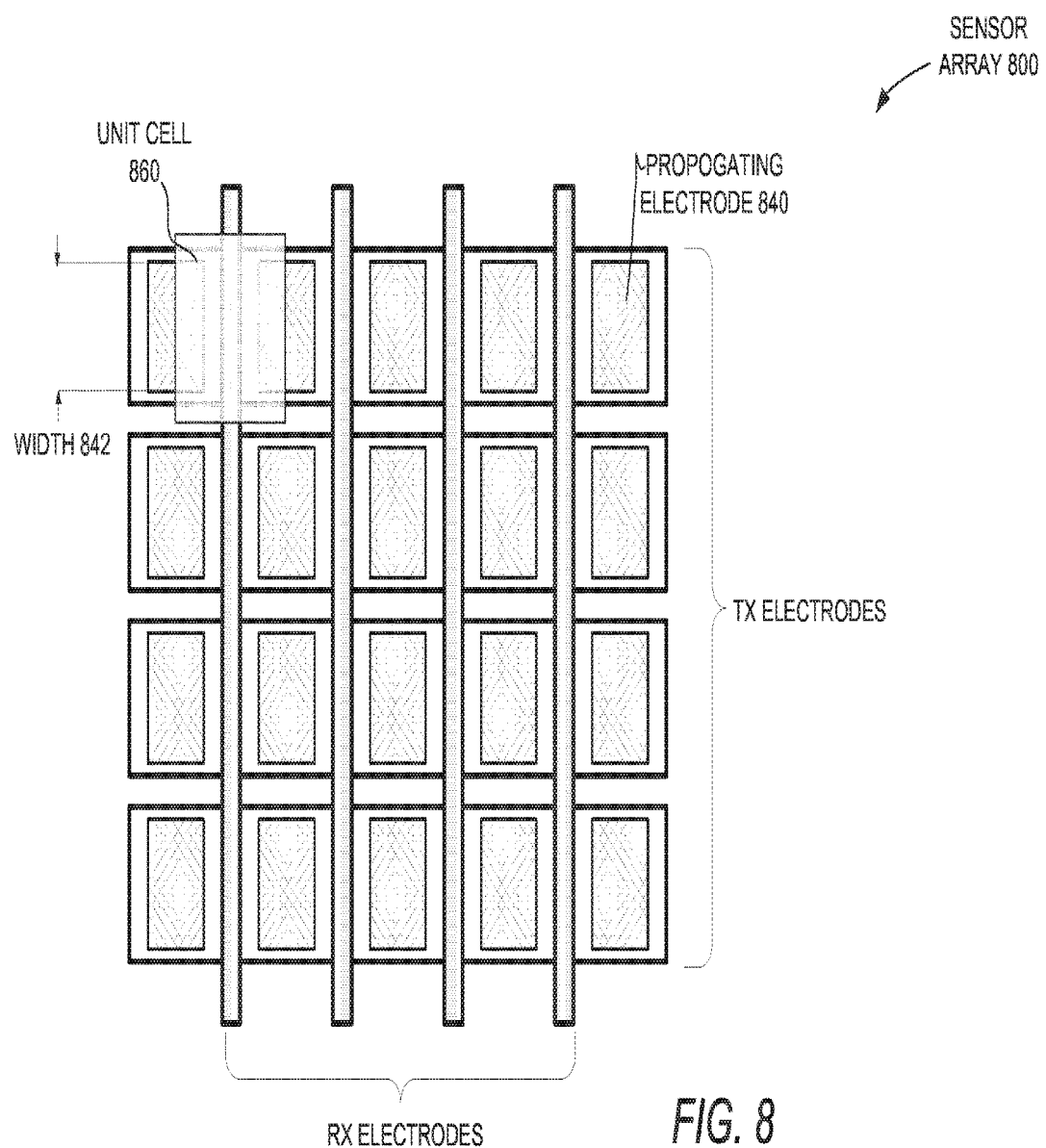
FIG. 8 show a plan view of a sensor array, in accordance with embodiments.
Figure 9:
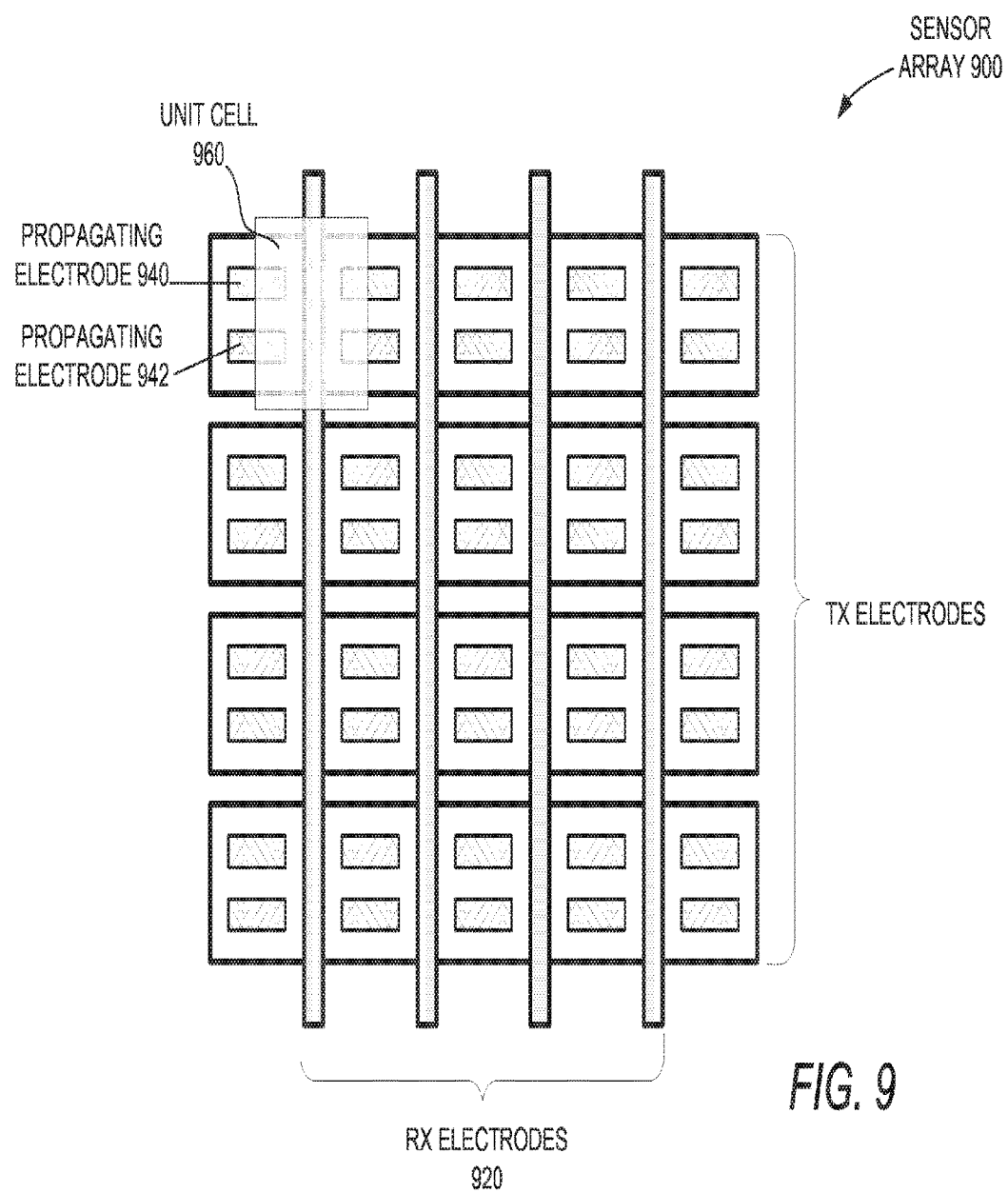
FIG. 9 shows a plan view of a sensor array, in accordance with embodiments.

Thus, different attributes of the TX electrodes, insulating layer, propagating electrodes, RX electrodes and/or overlay material and relationships (e.g., physical and electrical) between these components may be applied in various combinations, per capacitive sensor, and adjusted to design capacitive sensors that meet targeted sensor signal levels, anisotropy, at acceptable SNR. For example, FIGS. 8-11 show a plan view of various sensor arrays, in accordance with embodiments. In FIGS. 8-11, the TX electrodes may be the same as the TX electrodes 302 of FIG. 3. In FIGS. 8 and 9 the RX electrodes may be the same as the RX electrodes 320 of FIG. 3.

FIG. 8 shows an example sensor array 800 in which the width 842 of portions of propagating electrodes 840 within the unit cell 860 (e.g., and the corresponding capacitive sensor) is greater than the width 342 of the propagating electrodes 340 within the unit cell 360 of FIG. 3. Other embodiments may include propagating electrodes within the unit cell 860 of various numbers, shapes, and sizes without departing from the claimed subject matter. FIG. 9 shows an example sensor array 900 in which each unit cell 960 (e.g. and the corresponding capacitive sensor) includes a portion of two propagating electrodes 940 and 942 on opposite sides of an RX electrode 920. In other embodiments, another unit cell of the sensor array 900 may include a portion of any number of propagating electrodes, of any size or shape, and some unit cells of the sensor array 900 may not include any portion of propagating electrode.

Figure 10:
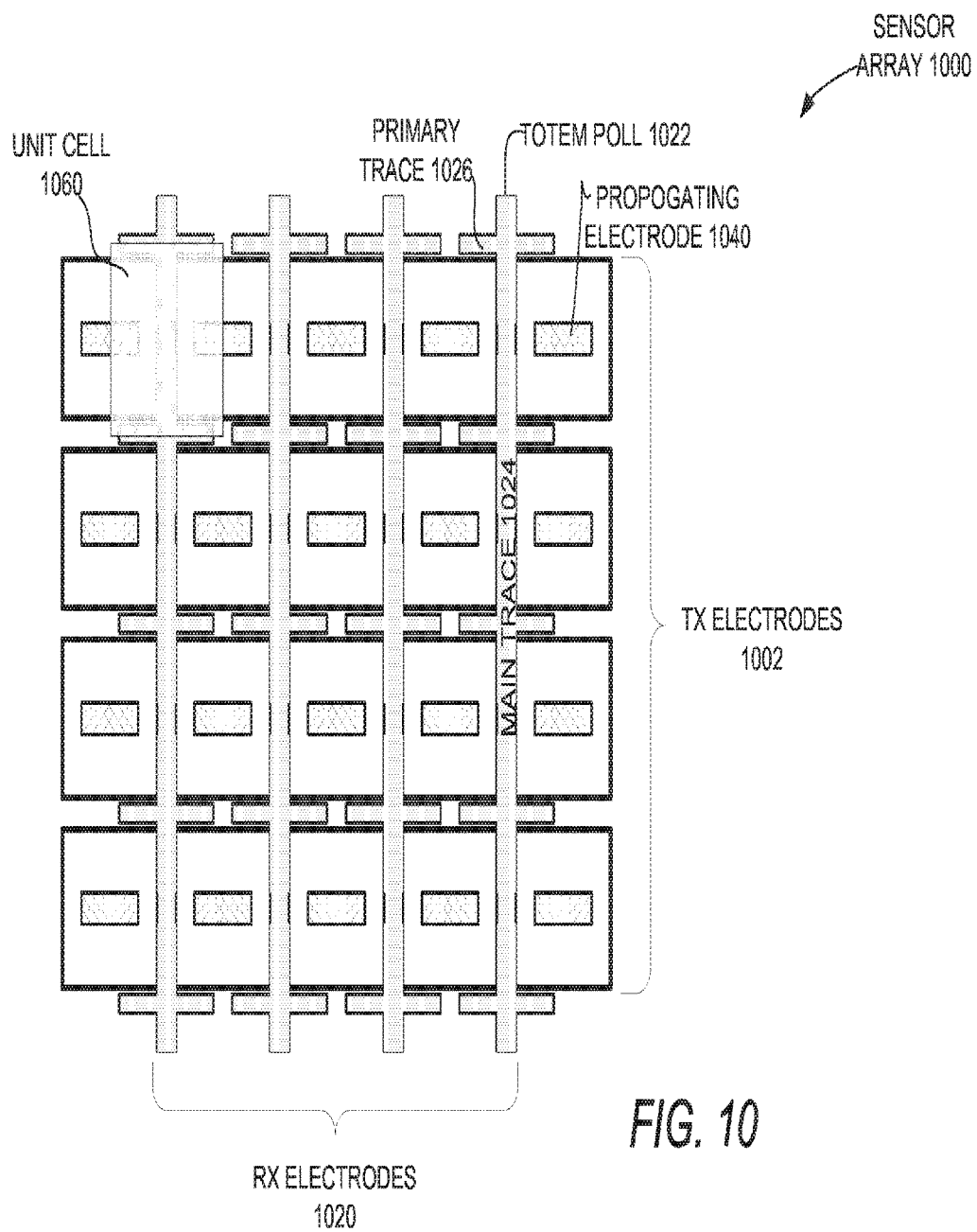
FIG. 10 shows a plan view of a sensor array, in accordance with embodiments.

FIG. 10 shows an example sensor array 1000 in which a unit cell 1060 (e.g., and the corresponding capacitive sensor) includes a propagating electrode 1040 and a totem pole 1022 style RX electrode 1020. The totem pole 1022 increases the fringe capacitance between the edges of the TX electrode 1002 and the RX electrode 1020 within the unit cell 1060 and also between the propagating electrodes 1040 and the RX electrode 1020 compared to those in the unit cell 360 of FIG. 3. The increased fringe capacitance between the edges of the two may increase capacitance between the TX electrode 1020 and the RX electrode 1002 and between the RX electrode 1020 and the propagating electrodes 1040, which improves sensor sensitivity in an embodiment. The totem pole 1022 shape of each RX electrode 1020 includes a main trace 1024 and primary traces 1026, that branch away from the main trace 1024. The unit cell 1060 is shown to include a portion of main trace 1024 and portions of four primary traces 1026. It can readily be seen that an RX electrode, a TX electrode, or a propagating electrode 1040 may include additional branching traces (e.g., primary, secondary, tertiary) to further increase fringe capacitance between edges of TX electrodes, RX electrodes, and propagating electrodes. Of course, a sensor array may include, in combination with propagating electrodes, other types of RX electrode, TX electrode, propagating electrode patterns (e.g., interleaving and/or interdigitated) that increase fringe capacitance between electrode edges to improve capacitive sensor sensitivity and SNR.

Figure 11:
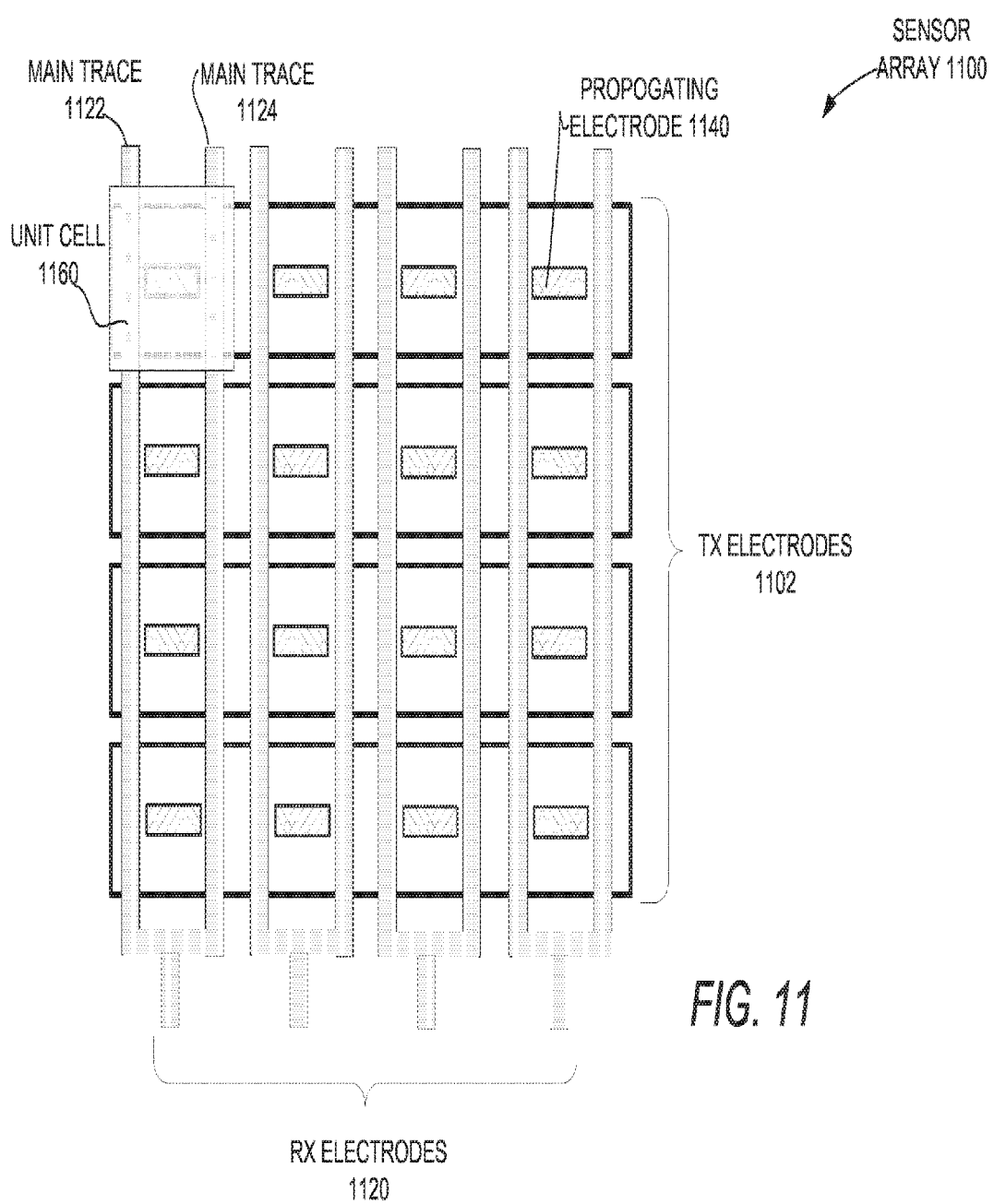
FIG. 11 shows a plan view of a sensor array, in accordance with embodiments.

For example, FIG. 11 shows an example sensor array 1100 in which a unit cell 1160 (e.g., and the corresponding capacitive sensor) includes a propagating electrode 1140 and an RX electrode 1120 including two main traces 1122 and 1124, which are conductively coupled and measured as a single RX electrode. As with the totem pole pattern 1022 of FIG. 10, the two main traces 1122 and 1124 provide increased fringe capacitance at the edges of the RX electrode in the unit cell 1160. In this embodiment, for the propagating electrode 1140 within the unit cell 1160, the entire area of the propagating electrode 1140 (e.g., as shown in the plan view) is within the area of the unit cell 1160 and within the area of the TX electrode 1102.

Figure 12:
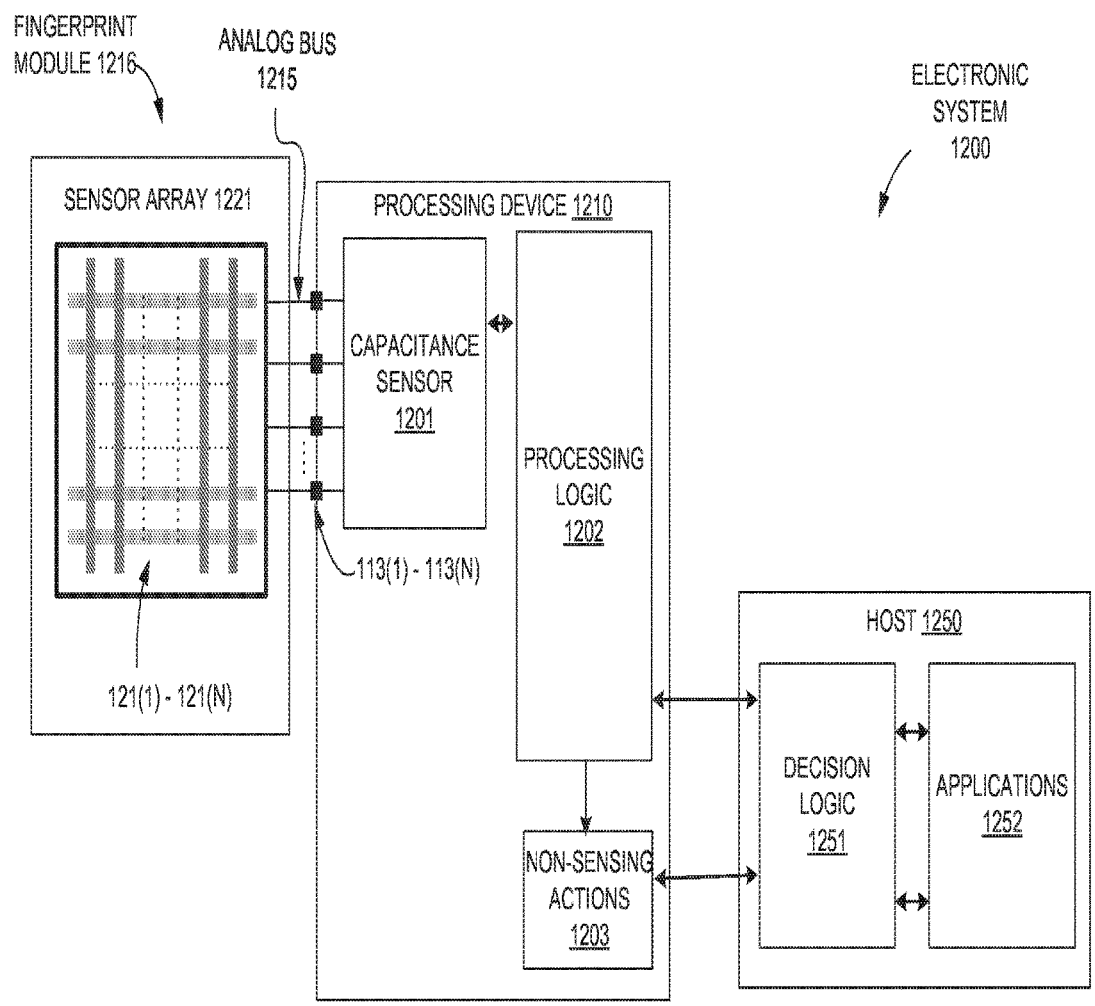
FIG. 12 is a block diagram illustrating an electronic system, in accordance with embodiments.

FIG. 12 is a block diagram illustrating one embodiment of an electronic system 1200 including a processing device 1210 that may be configured to generate a fingerprint image. The electronic system 1200 may includes a fingerprint module 1216 (e.g., the fingerprint module 104 of FIG. 1) coupled to the processing device 1210 and a host 1250. In one embodiment, the fingerprint module 1216 is a two-dimensional interface that uses the sensor array 1221 to detect fingerprints on the surface of the fingerprint module 1216. In various embodiments, the sensor array 1221 may include sensor array 300 of FIG. 3, the sensor array 800 of FIG. 8, the sensor array 900 of FIG. 9, the sensor array 1000 of FIG. 10, the sensor array 1100 of FIG. 11, or any other sensor array in accordance with the embodiments described herein.

In one embodiment, the sensor array 1221 includes sensor electrodes 121(1)-121(N) (where N is a positive integer) that are disposed as a two-dimensional matrix (also referred to as an XY matrix). The sensor array 1221 is coupled to pins 113(1)-113(N) of the processing device 1210 via one or more analog buses 1215 transporting multiple signals. The propagating electrodes (not shown) described herein may be disposed in the sensor array.

The capacitance sensor 1201 may include conversion circuitry to convert a capacitance into a measured value. The capacitance sensor 1201 may also include a counter or timer circuitry to measure the output of the conversion circuitry. The processing device 1210 may further include software components to convert the count value (e.g., capacitance value) into a sensor electrode detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 1201 may be evaluating other measurements to determine the user interaction. For example, in the capacitance sensor 1201 having a sigma-delta modulator, the capacitance sensor 1201 is evaluating the ratio of pulse widths of the output, instead of the raw counts being over or under a certain threshold.

In one embodiment, the processing device 1210 further includes processing logic 1202. Operations of the processing logic 1202 may be implemented in firmware; alternatively, it may be implemented in hardware or software. The processing logic 1202 may receive signals from the capacitance sensor 1201, and determine the state of the sensor array 1221, such as whether an object (e.g., a finger) is detected on or in proximity to the sensor array 1221 (e.g., determining the presence of the finger), tracking the motion of the object, detecting features (e.g., fingerprint ridges and valleys) based on the received signals, or other information related to an object detected at the fingerprint module 1216.

In another embodiment, instead of performing the operations of the processing logic 1202 in the processing device 1210, the processing device 1210 may send the raw data or partially-processed data to the host 1250. The host 1250 may include decision logic 1251 that performs some or all of the operations of the processing logic 1202. Operations of the decision logic 1251 may be implemented in firmware, hardware, software, or a combination thereof. The host 1250 may include a high-level Application Programming Interface (API) in applications 1252 that perform routines on the received data, such as compensating for sensitivity differences, other compensation algorithms, baseline update routines, start-up and/or initialization routines, interpolation operations, or scaling operations. The operations described with respect to the processing logic 1202 may be implemented in the decision logic 1251, the applications 1252, or in other hardware, software, and/or firmware external to the processing device 1210. In some other embodiments, the processing device 1210 is the host 1250.

In another embodiment, the processing device 1210 may also include a non-sensing actions block 1203. This block 1203 may be used to process and/or receive/transmit data to and from the host 1250. For example, additional components may be implemented to operate with the processing device 1210 along with the sensor array 1221 (e.g., keyboard, keypad, mouse, trackball, LEDs, displays, or other peripheral devices).

The processing device 1210 may reside on a common carrier substrate such as, for example, an integrated circuit (IC) die substrate, or a multi-chip module substrate. Alternatively, the components of the processing device 1210 may be one or more separate integrated circuits and/or discrete components. In one embodiment, the processing device 1210 may be the Programmable System on a Chip (PSoC™) processing device, developed by Cypress Semiconductor Corporation, San Jose, Calif. Alternatively, the processing device 1210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 1210 may be a network processor having multiple processors including a core unit and multiple micro-engines. Additionally, the processing device 1210 may include any combination of general-purpose processing device(s) and special-purpose processing device(s).

In one embodiment, the electronic system 1200 is implemented in a device that includes the fingerprint module 1216 as part of the user interface, such as in handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 1200 may be used in other types of devices. It should be noted that the components of electronic system 1200 may include all the components described above. Alternatively, electronic system 1200 may include only some of the components described above, or include additional components not listed herein.

Figure 13:
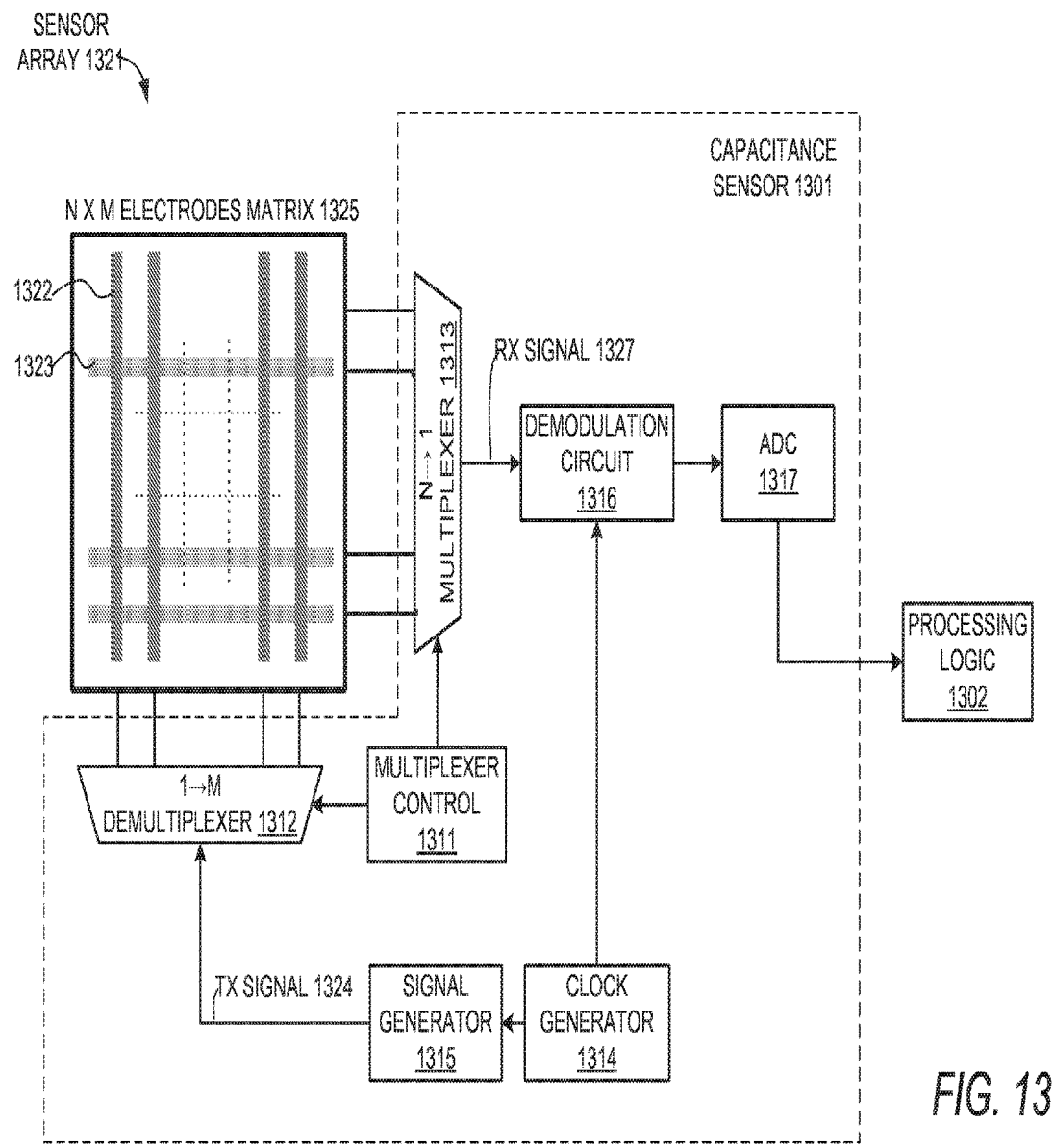
FIG. 13 is a block diagram illustrating a sensor array and a capacitance sensor, in accordance with embodiments.

FIG. 13 is a block diagram illustrating one embodiment of a sensor array 1321 and a capacitance sensor 1301 that converts changes in measured capacitances to a fingerprint image. In various embodiments, the sensor array 1321 may include sensor array 300 of FIG. 3, the sensor array 800 of FIG. 8, the sensor array 900 of FIG. 9, the sensor array 1000 of FIG. 10, the sensor array 1100 of FIG. 11, or any other sensor array in accordance with the embodiments described herein. The fingerprint features are calculated based on changes in measured capacitances relative to the capacitances of the same sensor array 1321 in an un-touched state. In one embodiment, sensor array 1321 and capacitance sensor 1301 are implemented in a system such as electronic system 1200. Sensor array 1321 includes a matrix 1325 of N×M electrodes (N RX electrodes and M TX electrodes), which further includes TX electrodes 1322, RX electrodes 1323, and propagating electrodes (not shown) as described in various embodiments herein. Each of the electrodes in matrix 1325 is connected with capacitance sensing circuit 1301 through demultiplexer 1312 and multiplexer 1313.

Capacitance sensor 1301 includes multiplexer control 1311, demultiplexer 1312 and multiplexer 1313, clock generator 1314, signal generator 1315, demodulation circuit 1316, and analog to digital converter (ADC) 1317.

The TX and RX electrodes in the electrode matrix 1325 may be arranged so that each of the TX electrodes overlap and cross each of the RX electrodes such as to form an array of intersections, while maintaining galvanic isolation from each other. The propagating electrodes of the sensor array 1321 also are also maintained in galvanic isolation from the RX electrodes in some embodiments and bother the RX electrodes and TX electrodes in other embodiments. Thus, each TX electrode and at least on propagating electrode may be capacitively coupled with each of the RX electrodes. For example, TX electrode 1322 is capacitively coupled with RX electrode 1323 at the point where TX electrode 1322 and RX electrode 1323 overlap.

Signal generator 1314 supplies a clock signal to signal generator 1315, which produces a TX signal 1324 to be supplied to the TX electrodes of sensor array 1321 array. In one embodiment, the signal generator 1315 includes a set of switches that operate according to the clock signal from clock generator 1314. The switches may generate a TX signal 1324 by periodically connecting the output of signal generator 1315 to a first voltage and then to a second voltage, wherein said first and second voltages are different.

The output of signal generator 1315 is connected with demultiplexer 1312, which allows the TX signal 1324 to be applied to any of the M TX electrodes of sensor array 1321. In one embodiment, multiplexer control 1311 controls demultiplexer 1312 so that the TX signal 1324 is applied to each TX electrode 1322 in a controlled sequence. Demultiplexer 1312 may also be used to ground, float, or connect an alternate signal to the other TX electrodes to which the TX signal 1324 is not currently being applied. In an embodiment utilizing multiphase TX sensing, different TX signals may be applied to different subsets of TX electrodes 1322. For example, the TX signal 1324 may be presented in a true form to a subset of the TX electrodes 1322 and in complement or phase-altered form to a second subset of the TX electrodes 1322, where there is no overlap in members of the first and second subset of TX electrodes 1322. In alternative embodiments, the different TX signals may be unrelated (i.e., not phase-shifted versions of each other).

Because of the electrical coupling between the TX, RX, and propagating electrodes, the TX signal 1324 applied to each TX electrode induces a current within each of the RX electrodes. For instance, when the TX signal 1324 is applied to TX electrode 1322 through demultiplexer 1312, the TX signal 1324, in combination with propagating electrodes (not shown) induces an RX signal 1327 on the RX electrodes in matrix 1325. The RX signal 1327 on each of the RX electrodes can then be measured in sequence by using multiplexer 1313 to connect each of the N RX electrodes to demodulation circuit 1316 in sequence.

The mutual capacitance associated with each intersection between a TX electrode and an RX electrode can be sensed by selecting every available combination of TX electrode and an Rx electrode using demultiplexer 1312 and multiplexer 1313. To improve performance, multiplexer 1313 may also be segmented to allow more than one of the RX electrodes in matrix 1325 to be routed to demodulation circuits 1316. In an optimized configuration, wherein there is a 1-to-1 correspondence of instances of demodulation circuit 1316 with RX electrodes, multiplexer 1313 may not be present in the system.

When a finger is in contact with the electrode matrix 1325, the different fingerprint features may cause different changes in the measured mutual capacitances between the electrodes. For example, a fingerprint ridge near the intersection of TX electrode 1322 and RX electrode 1323 will decrease the charge coupled between electrodes 1322 and 1323 by a greater amount than a valley at the same location. Thus, the locations of fingerprint ridges and valleys on the sensor can be determined by identifying RX electrodes having a decrease in measured mutual capacitance in addition to identifying the TX electrode at which the corresponding TX signal 1324 was applied. By determining the mutual capacitances associated with each intersection of electrodes in the matrix 1325, the locations of fingerprint features may be determined. The determination may be sequential, in parallel, or may occur more frequently at commonly used electrodes. The induced RX signal 1327 is integrated by demodulation circuit 1316. The rectified current output by demodulation circuit 1316 can then be filtered and converted to a digital code by ADC 1317, which can then be used by the processing logic 1302 to generate the fingerprint image.

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A fingerprint sensor array, comprising:
a plurality of first electrodes disposed in a first layer, wherein the plurality of first electrodes is arranged according to a pitch of the first electrodes;
a plurality of second electrodes disposed in a second layer, wherein each second electrode crosses each first electrode to provide a pattern of non-overlapping sensor areas wherein each non-overlapping sensor area is associated with a different crossing; and
a plurality of propagating electrodes disposed in the second layer, wherein each non-overlapping sensing area includes a portion of at least one propagating electrode, and wherein each of the plurality of second electrodes is galvanically isolated from the plurality of first electrodes and the plurality of propagating electrodes.

2. The fingerprint sensor array of claim 1, wherein one or more of the plurality of propagating electrodes is coupled to a first electrode, of the plurality of first electrodes, through a conductive member.

3. The fingerprint sensor array of claim 1, wherein one or more of the plurality of propagating electrodes is capacitively coupled to a first electrode, of the plurality of first electrodes, through a dielectric material.

4. The fingerprint sensor array of claim 1, wherein each non-overlapping sensor area includes at least a portion of a first propagating electrode and at least a portion of a second propagation electrode, wherein a portion of each second electrode within each sensor area is disposed between at least the portion of the first propagating electrode and at least the portion of the second propagating electrode.

5. The fingerprint sensor array of claim 1, wherein a first group of propagating electrodes, of the plurality of propagating electrodes, is associated with a first electrode, of the plurality of first electrodes, wherein each propagating electrode of the first group is aligned with another propagating electrode of the first group, along an axis of the first electrode.

6. The fingerprint sensor array of claim 1, wherein a width of each first electrode is greater than half the pitch of the first electrodes.

7. The fingerprint sensor array of claim 1, wherein a width of each third electrode is less than half the pitch of the second electrodes.

8. The fingerprint sensor array of claim 1, wherein a width of each third electrode is the same as a width of at least one of the second plurality of electrodes.

9. The fingerprint sensor array of claim 1, wherein a width of each first electrode is greater than half the pitch of the first electrodes.

10. The fingerprint sensor array of claim 1, wherein the second electrode of at least one of the sensor areas comprises a main trace and a primary trace that branches away from the main trace, wherein the sensor area includes at least a portion of the primary trace.

11. The fingerprint sensor array of claim 1, wherein the second electrode of at least one of the sensor areas comprises a plurality of main traces.

12. A method comprising:
driving one or more transmit signals on a plurality of first electrodes disposed in a first layer and a plurality of propagating electrodes disposed in a second layer; and
measuring a capacitance of each of a plurality of sensors through a plurality of second electrodes, wherein each second electrode crosses each first electrode to provide a plurality of discrete sensors, wherein each discrete sensor includes a portion of at least one propagating electrode, and wherein each of the plurality of second electrodes is galvanically isolated from the plurality of first electrodes and the plurality of propagating electrodes.

13. The method of claim 12, wherein the driving of the one or more transmit signals on the plurality of propagating electrodes comprises conductively coupling to the propagating electrodes.

14. The method of claim 12, wherein the driving of the one or more transmit signals on the plurality of propagating electrodes comprises capacitively coupling to the propagating electrodes.

15. A system comprising:
a fingerprint module comprising transmit electrodes disposed in a first layer, receive electrodes disposed in a second layer and propagating electrodes disposed in the second layer, wherein each receive electrode crosses each transmit electrode to provide a plurality of discrete sensor areas, each discrete sensor area associated with a different crossing and comprising a portion of at least one propagating electrode;
an insulating material disposed between the first layer and the second layer;
an overlay material disposed above the second layer; and
a processing device coupled to the fingerprint module to drive the transmit electrodes and provide fingerprint data based on sensor signals received through the receive electrodes.

16. The system of claim 15, wherein the receive electrode of at least one of the discrete sensor areas comprises a main trace and a primary trace that branches away from the main trace, wherein the at least one discrete sensor area includes at least a portion of the primary trace.

17. The system of claim 15, wherein the receive electrode of at least one of the discrete sensor areas comprises a plurality of main traces.

18. The system of claim 15, wherein the overlay material is between 100 um and 250 um thick.

19. The system of claim 15, wherein a width of each transmit electrode is wider than half a pitch of the discrete sensor areas.

20. The system of claim 15, wherein each transmit electrode is between 20 um and 65 um wide and each receive electrode is between Sum and 15 um wide.

* * * * *